United States Patent
Firnkes

(10) Patent No.: US 11,138,199 B2
(45) Date of Patent: Oct. 5, 2021

(54) THROUGHPUT OPTIMIZATION IN DISTRIBUTED DATABASE SYSTEMS USING HYPERGRAPH PARTITIONING

(71) Applicant: SAP SE, Walldorf (DE)

(72) Inventor: Patrick Firnkes, Ubstadt-Weiher (DE)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 16/587,207

(22) Filed: Sep. 30, 2019

(65) Prior Publication Data
US 2021/0097081 A1    Apr. 1, 2021

(51) Int. Cl.
*G06F 16/00* (2019.01)
*G06F 16/2455* (2019.01)
*G06F 16/901* (2019.01)
*G06F 16/27* (2019.01)

(52) U.S. Cl.
CPC ........ *G06F 16/24554* (2019.01); *G06F 16/27* (2019.01); *G06F 16/9024* (2019.01)

(58) Field of Classification Search
CPC .......... G06F 16/24554; G06F 16/9024; G06F 16/27; G06F 16/2471
See application file for complete search history.

(56) References Cited

U.S. PATENT DOCUMENTS

| | | | | |
|---|---|---|---|---|
| 6,049,797 A * | 4/2000 | Guha | ................... | G06K 9/6218 |
| 8,046,768 B2 * | 10/2011 | Smith | ................... | G06F 9/4881 |
| | | | | 718/104 |
| 8,332,390 B2 * | 12/2012 | Yan | ................... | G06F 16/2471 |
| | | | | 707/719 |
| 10,769,126 B1 * | 9/2020 | Hagerup | ............. | G06F 16/2453 |
| 2008/0086469 A1 * | 4/2008 | Gu | ................... | G06F 11/3447 |
| 2012/0036249 A1 * | 2/2012 | Chandrasekaran | ... | G06F 9/5088 |
| | | | | 709/224 |
| 2017/0039232 A1 * | 2/2017 | Jayanth | ................. | G06F 16/278 |
| 2020/0057809 A1 * | 2/2020 | Xu | ........................ | G06K 9/6218 |
| 2020/0387548 A1 * | 12/2020 | Han | .................... | G06F 16/9024 |

OTHER PUBLICATIONS

Romi Kumar, How To Use Sharding Without Sacrificing Security, May 2, 2019, HackerNoon.com, pp. 1-9 (Year: 2019).*

(Continued)

*Primary Examiner* — Alexander Khong
(74) *Attorney, Agent, or Firm* — Fish & Richardson P.C.

(57) ABSTRACT

Methods, systems, and computer-readable storage media for receiving workload data, the workload data including queries executed within a distributed database system over a period of time, defining windows, each window including a time slice within the period of time, generating a hypergraph for each window, each hypergraph including vertices and hyperedges and being generated based on a sub-set of queries and weight functions, partitioning each hypergraph into blocks, for each shard in a set of shards, determining a set of ratings, each rating in the set of ratings being based on a weight of a respective share with respect to a respective block, and assigning each shard in the set of shards to a block in the set of blocks based on the set of ratings for the respective shard, the shard being assigned to a block, for which a maximum rating is provided in the set of ratings.

20 Claims, 6 Drawing Sheets

(56) References Cited

OTHER PUBLICATIONS

Akhremtsev et al., "Engineering a direct k-way hypergraph partitioning algorithm." 2017 Proceedings of the Ninteenth Workshop on Algorithm Engineering and Experiments (ALENEX). Society for Industrial and Applied Mathematics, 2017, 15 pages.

Aykanat et al., "Multi-level direct k-way hypergraph partitioning with multiple constraints and fixed vertices." Journal of Parallel and Distributed Computing 68.5, May 1, 2008, 17 pages.

Boissier et al., "Workload-Driven Horizontal Partitioning and Pruning for Large HTAP Systems." 2018 IEEE 34th International Conference on Data Engineering Workshops (ICDEW). IEEE, Apr. 16, 2018, 6 pages.

Brown.edu(Online)., "H-Store documentation" created on Dec. 13, 2012. [Retrieved on Sep. 24, 2019] retrieved from: URL <http://hstore.cs.brown.edu/documentation/>, 2 pages.

Catalyurek et al., "Hypergraph-based dynamic load balancing for adaptive scientific computations." 2007 IEEE International Parallel and Distributed Processing Symposium. IEEE, Mar. 26, 2007, 11 pages.

Chaudhuri et al., "An overview of data warehousing and OLAP technology" ACM Sigmod record 26.1, Mar. 1, 1997, 10 pages.

Chen et al., "TPC-E vs. TPC-C: characterizing the new TPC-E benchmark via an I/O comparison study." ACM SIGMOD Record 39.3, Feb. 8, 2011, 6 pages.

Cheng et al., "Maximum-weight bipartite matching technique and its application in image feature matching." Visual Communications and Image Processing'96. vol. 2727. International Society for Optics and Photonics, Feb. 27, 1996, 10 pages.

Curino et al., "Schism: a workload-driven approach to database replication and partitioning." Proceedings of the VLDB Endowment 3.1-2, Sep. 3, 2010, 10 pages.

Devine et al., "Parallel hypergraph partitioning for scientific computing." Proceedings 20th IEEE International Parallel & Distributed Processing Symposium, IEEE, Apr. 25, 2006, 15 pages.

Elnaffar et al., "Characterizing computer systems' workloads." Submitted to ACM Computing Surveys Journal, Dec. 2002, 66 pages.

Goel et al., "Towards scalable real-time analytics: an architecture for scale-out of OLxP workloads." Proceedings of the VLDB Endowment 8.12, Aug. 1, 2015, 12 pages.

Heuer et al.. "Improving coarsening schemes for hypergraph partitioning by exploiting community structure." 16th International Symposium on Experimental Algorithms (SEA 2017), 19 pages.

Heuer et al., "Network flow-based refinement for multilevel hypergraph partitioning." Journal of Experimental Algorithmics (JEA) 24.1, Sep. 5, 2019, 28 pages.

Heuer, High Quality Hypergraph Partitioning via Max-Flow-Min-Cut Computations, Diss. Master's thesis, KIT, May 1, 2018, 64 pages.

Hu et al., "Multiterminal flows in a hvpergraph." VLSI circuit layout: theory and design. 1985, 7 pages.

Ihler et al., "Modeling hypergraphs by graphs with the same mincut properties." Information Processing Letters 45.4, Mar. 22, 1993, 8 pages.

Karypis et al., "Multilevel hypergraph partitioning: applications in VLSI domain." IEEE Transactions on Very Large Scale Integration (VLSI) Systems 7.1. Mar. 1999, 11 pages.

Katoh et al., "Resource allocation problems." Handbook of combinatorial optimization (2013), 3399 pages.

Kuhn, "The Hungarian method for the assignment problem." Naval research logistics quarterly 2.1-2, Mar. 1955, 811 pages.

Lengauer, Combinatorial algorithms for integrated circuit layout. Springer Science & Business Media, Dec. 6, 2012, 715 pages.

Leutenegeer et al., A modeling study of the TPC-C benchmark. vol. 22. No. 2. ACM, Jun. 1, 1993, 41 pages.

Nam et al., "A Graph-based Database Partitioning Method for Parallel OLAP Query Processing." 2018 IEEE 34th International Conference on Data Engineering (ICDE). IEEE, Apr. 16, 2018, 12 pages.

Oracle.com[Online], "Database VLDB and partitioning guide" Available on or before Aug. 10, 2014, via Internet Archive: Wayback Machine URL <https://web.archive.org/web/20190713144832/https://docs.oracle.com/database/121/VLDBG/toc.htm>, [Retrieved on Jul. 13, 2019], retrieved from: URL <https://docs.oracle.com/database/121/VLDBG/toc.htm>, 2 pages.

Özsu et al., Principles of distributed database systems. Springer Science & Business Media, Feb. 24, 2011, 24 pages.

Quamar et al., "SWORD: scalable workload-aware data placement for transactional workloads." Proceedings of the 16th International Conference on Extending Database Technology. ACM, Mar. 18, 2013, 12 pages.

SAP.com[Online], "SAP Help Portal" Available on or before September 8, 2019. via Interner Archive: Wayback Machine URL <https://web.archive.org/web/20190908195618/https://help.sap.com/viewer/index>, [Retrieved on Sep. 24, 2019] retrieved from: URL <https://help.sap.com/doc/d873bf7ac8e14a7eb7alab686d3028a7/2.4.latest/en-US/loiod873bf7ac8e14a7eb7alab686d3028a7>, 1 page.

Schlag et al., "k-way Hvpergraph Partitioning via n-Level Recursive Bisection." 2016 Proceedings of the Eighteenth Workshop on Algorithm Engineering and Experiments (ALENEX). Society for Industrial and Applied Mathematics, 2016, 21 pages.

Serafini et al., "Clay: fine-grained adaptive partitioning for general database schemas." Proceedings of the VLDB Endowment 10.4, Nov. 1, 2016, 12 pages.

TPC.org[Online], "TPC-C database schema" available on or before Aug. 11, 2019, via Wayback Machine URL <https://web.archive.org/web/20190811001449/http://www.tpc.org/information/sessions/sigmod/img009.jpg>, [Retrieved on Sep. 24, 2019], retrieved from: URL <http://www.tpc.org/information/sessions/sigmod/img009.jpg>, 1 page.

Turk et al., "Temporal workload-aware replicated partitioning for social networks." IEEE transactions on knowledge and data engineering 26.11, Jan. 23, 2014, 14 pages.

Yang et al., "HEPart: A balanced hvpergraph partitioning algorithm for big data applications." Future Generation Computer Systems 83, Jun. 1, 2018, 31 pages.

Yang et al., "Summarizing relational databases." Proceedings of the VLDB Endowment 2.1, Aug. 1, 2009, 12 pages.

Yu et al.. "Location-aware associated data placement for geo-distributed data-intensive applications." 2015 IEEE Conference on Computer Communications (INFOCOM). IEEE. Apr. 26, 2015, 9 pages.

* cited by examiner

THROUGHPUT OPTIMIZATION IN DISTRIBUTED DATABASE SYSTEMS USING HYPERGRAPH PARTITIONING

BACKGROUND

In the age of big data and cloud computing, databases are frequently distributed over multiple physical machines called hosts. The primary way in which distributed databases are scaled is through horizontal partitioning of tables into shards and assigning the shards to hosts in a cluster. The assignment of shards, also referred to as allocation, affects the performance of the distributed database system. A distributed query is a query that accesses shards that are distributed across different hosts. Consequently, multiple hosts participate in processing of distributed queries.

In some circumstances, it is favorable to minimize the number of distributed queries, while balancing the load across hosts to substantially increase the transaction throughput. To realize this, existing approaches place shards that are frequently accessed together on the same host, while keeping the load of the hosts balanced. Load balancing is used to avoid overloading some hosts while other hosts are idling, which leads to performance degradation. This problem is referred to as an allocation problem. That is, for a given set of shards and an expected query workload, the goal is to allocate the shards to hosts of a cluster such that a certain objective function is maximized or minimized. Example objective functions can include the throughput of the distributed database system, and the response time of queries.

Traditional approaches for solving the allocation problem use a graph or hypergraph model of the workload and partition the model using graph or hypergraph partitioning to create an optimized shard assignment. In such workload models, vertices represent shards and edges represent queries that co-access the spanned shards. However, traditional approaches do not account for changes in the workload over time and do not detect changes in the intensity or mixture of the workload. Further, traditional approaches cannot detect patterns in the workload, which can result in an assignment that is non-optimal for each of multiple patterns as it is imbalanced at any point in time.

SUMMARY

Implementations of the present disclosure are directed to reassignment of shards across hosts in distributed database systems. More particularly, and as described in further detail herein, implementations of the present disclosure are directed to a workload-aware reassignment framework for reassignment of shards in distributed database systems, the workload-aware reassignment accounting for changes in workload over time in order to react to changes in the workload patterns and/or to peaks in the workload.

In some implementations, actions include receiving workload data, the workload data including a set of queries executed within a distributed database system over a period of time, defining a set of windows, each window including a time slice within the period of time, generating a hypergraph for each window in the set of windows, each hypergraph including a set of vertices and a set of hyperedges and being generated based on a sub-set of queries of the set of queries and a set of weight functions, partitioning each hypergraph into a set of blocks, for each shard in a set of shards, determining a set of ratings, each rating in the set of ratings being based on a weight of a respective share with respect to a respective block, and assigning each shard in the set of shards to a block in the set of blocks based on the set of ratings for the respective shard, the shard being assigned to a block, for which a maximum rating is provided in the set of ratings. Other implementations of this aspect include corresponding systems, apparatus, and computer programs, configured to perform the actions of the methods, encoded on computer storage devices.

These and other implementations can each optionally include one or more of the following features: the set of windows is defined based on a window size, a window step, an earliest start time of the queries in the set of queries, and a latest end time of the queries in the set of queries; weight functions in the set of weight functions respectively represent a number of queries that a respective shard is part of and a number of queries that touch shards (i.e., that query data stored in the shards) included in a hyperedge of a respective hypergraph; a partition parameter is provided as input and each hypergraph is partitioned into blocks based on the partition parameter; each rating is calculated based on a maximum shard weight for shards in the set of shards, and a shard weight of the respective shard, for which the rating is calculated; actions further include assigning shards to hosts based on blocks that the shards are respectively assigned to; and the workload data is monitored in real-time as queries are executed within the distributed database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
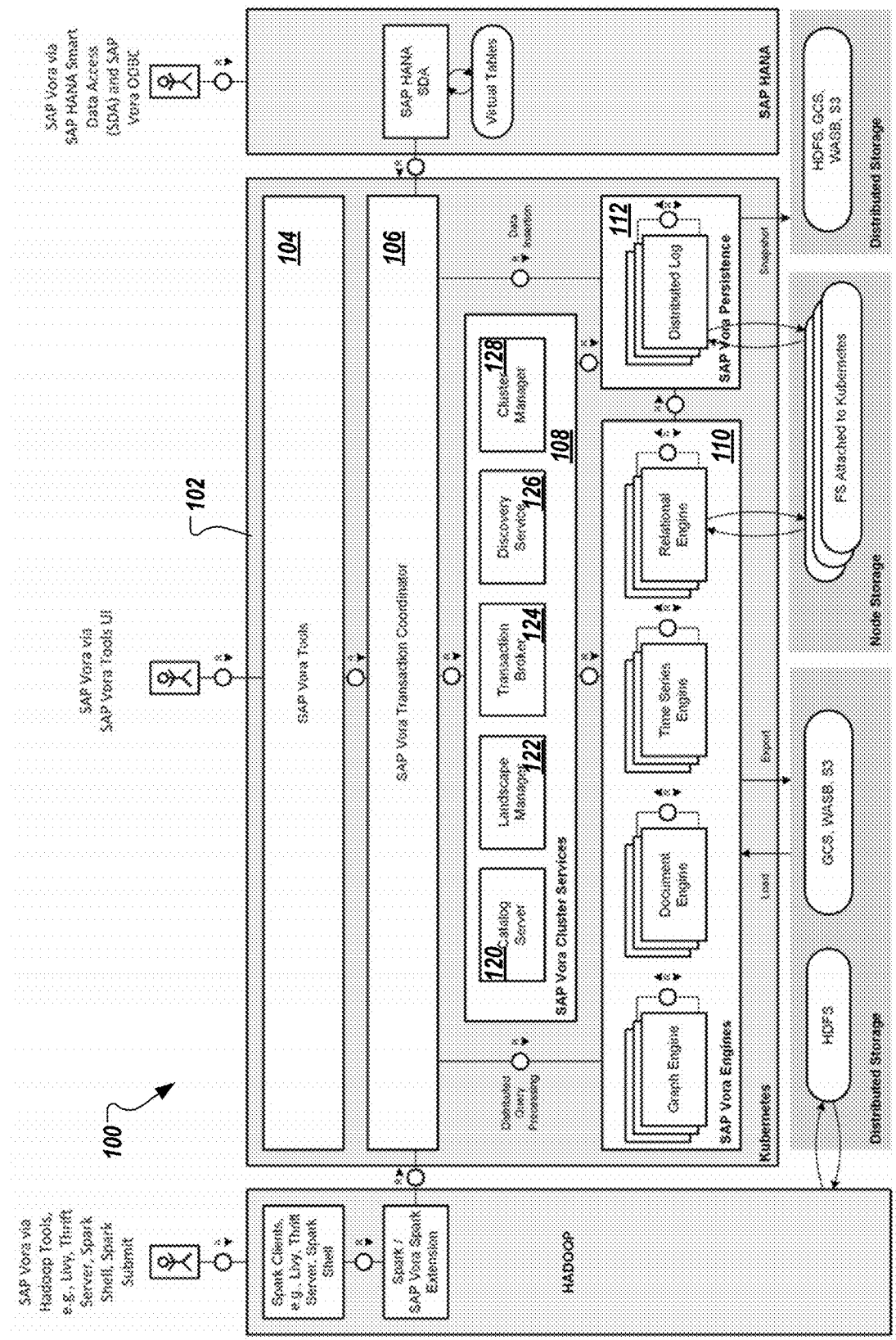
FIG. 1 schematically depicts an example distributed database system that can be used with implementations of the present disclosure.

Implementations of the present disclosure are directed to reassignment of shards across hosts in distributed database systems. More particularly, and as described in further detail herein, implementations of the present disclosure are directed to a workload-aware reassignment framework for reassignment of shards in distributed database systems, the workload-aware reassignment accounting for changes in workload over time in order to react to changes in the workload patterns and/or to peaks in the workload. Implementations can include actions of receiving workload data, the workload data including a set of queries executed within a distributed database system over a period of time, defining a set of windows, each window including a time slice within the period of time, generating a hypergraph for each window in the set of windows, each hypergraph including a set of vertices and a set of hyperedges and being generated based on a sub-set of queries of the set of queries and a set of weight functions, partitioning each hypergraph into a set of blocks, for each shard in a set of shards, determining a set of ratings, each rating in the set of ratings being based on a weight of a respective share with respect to a respective block, and assigning each shard in the set of shards to a block in the set of blocks based on the set of ratings for the respective shard, the shard being assigned to a block, for which a maximum rating is provided in the set of ratings.

To provide further context for implementations of the present disclosure, and as introduced above, in the age of big data and cloud computing, databases are frequently distributed over multiple physical machines called hosts. The primary way in which distributed databases are scaled is through horizontal partitioning of tables into shards and assigning the shards to hosts in a cluster. The assignment of shards, also referred to as allocation, affects the performance of the distributed database system. A distributed query is a query that accesses shards that are distributed across different hosts. Consequently, multiple hosts participate in processing of distributed queries.

In context of databases, workloads can be distinguished between OLAP (On-line Analytical Processing) workloads, which consist of mostly long running queries for data analyzing, and OLTP (On-line transaction processing) workloads. which consist of mostly short running queries for executing daily business tasks. In OLAP scenarios, distributed queries are favored in order to distribute the load and parallelize the processing of a query. However, in OLTP scenarios distributed queries are expensive in terms of time and technical resources to proves. Consequently, distributed queries are kept to a minimum in OLTP scenarios.

In contrast to OLAP workloads, OLTP workloads are highly selective and fast running, and do not gain much from parallel processing on multiple hosts. Consequently, performance of the distributed database system can be improved by reducing overhead introduced by distributed queries. On the one hand, distributed queries lead to a communication overhead because the data must be exchanged between the involved hosts. On the other hand, distributed queries lead to a duplication of the load as a distributed query must be processed on each involved host, blocking processing slots for other queries. This decreases the performance in OLTP workloads, as there are many parallel queries creating a high load in the system, whereas in OLAP workloads there are only a single or few queries at a time. Therefore, for OLTP workloads, it is favorable to minimize the number of distributed queries while balancing the load across hosts to substantially increase the transaction throughput.

In some circumstances, it is favorable to minimize the number of distributed queries while balancing the load across hosts to substantially increase the transaction throughput. To realize this, existing approaches place shards that are frequently accessed together on the same host, while keeping the load of the hosts balanced. Load balancing is used to avoid overloading some hosts while other hosts are idling, which leads to performance degradation. This problem is referred to as an allocation problem. That is, for a given set of shards and an expected query workload, the goal is to allocate the shards to hosts of a cluster such that a certain objective function is maximized or minimized. Example objective functions can include the throughput of the distributed database system, and the response time of queries. A common approach to solving the allocation problem is to use graph or hypergraph models of the workload and partition the model using graph or hypergraph partitioning to create an optimized shard assignment. In such workload models, vertices represent shards and edges represent queries that co-access the spanned shards.

However, such approaches do not account for changes in the workload over time when solving the allocation problem. Instead, traditional approaches build the workload model as an aggregation over all queries. Therefore, traditional approaches cannot detect changes in the intensity or mixture of the workload. Traditional approaches are also unable to optimize for times where the workload is much higher, which is when the best performing system is required. Also, without considering the workload over time, it is not possible to detect patterns in the workload. This can occur in multi-tenant databases where, for example, multiple teams from different regions are working on the same database. The teams access different parts of the database to execute their tasks, which leads to two different patterns of workloads. Partitioning the workload model of these two workload patterns without considering the workload over time could result in an assignment that is bad for both patterns as it is imbalanced at any point in time.

In view of the foregoing, implementations of the present disclosure are directed to a workload-aware reassignment framework for reassignment of shards in distributed database systems. In accordance with implementations of the present disclosure, the workload-aware reassignment accounts for changes in workload over time in order to react to changes in the workload patterns and/or to peaks in the workload. As described in further detail herein, the workload-aware database reassignment framework uses hypergraph partitioning to solve the allocation problem and is integrated into a commercial enterprise database system.

To provide further context for implementations of the present disclosure, hypergraphs can be described as a generalization of graphs, where a hyperedge (also called net) can connect more than two vertices (also called hypernodes).

Definition 1 (Hypergraph): A undirected weighted hypergraph $H=(V, E, c, \omega)$ is defined as a set of vertices $V$, a set of hyperedges $E$, where $\forall e \in E : e \subseteq V$, a hypernode weight function $c: V \rightarrow \mathbb{R}$, and a hyperedge weight function $\omega: E \rightarrow \mathbb{R}$. For a subset $V' \subseteq V$ and $E' \subseteq E$ it can be provided that:

$$c(V')=\Sigma_{v\in V'} c(v) \quad (1)$$

$$\omega(E')=\Sigma_{e\in E'} \omega(e) \quad (2)$$

A hypergraph H=(V, E) can be transformed into a graph by using the clique transformation or the bipartite transformation. The clique transformation creates a clique graph $G_c$=(V, $E_c$), where each hyperedge e∈E is modeled as a clique between all vertices u, v∈e with u≠v. More formally, $E_c$={{u, v}|∃e∈E: u,v∈e∧u≠v}. In contrast, the bipartite transformation creates a graph $G_b$=(V∪E, $E_b$) that models all vertices and hyperedges of H as nodes and connects each hyperedge e with an edge {e, v} to all vertices v∈e. More formally, $E_b$={{e, v}|∃e∈E: v∈e}.

Definition 2 (Hypergraph Partitioning Problem): The k-way hypergraph partitioning problem is to partition a hypergraph H into k disjoint non-empty blocks ⊓={$V_1$, . . . , $V_k$} while minimizing an objective function on the nets and keeping a balance constraint so that all blocks are nearly equal sized regarding an imbalance parameter ε. A partitioning result ⊓ is balanced if the following constraint is fulfilled:

$$\forall V_i \in \Pi : c(V_i) \le (1+\varepsilon)\cdot \left\lceil \frac{c(V)}{k} \right\rceil + \max_{v\in V} c(v) \quad (3)$$

The connectivity of a hyperedge e is defined as λ(e, ⊓)=|{$V_i$∈⊓|$V_i$∩e≠∅}|, which is the number of blocks a hyperedge e is part of. A hyperedge e is cut if λ(e, ⊓)>1. Further, E(⊓)={e∈E|λ(e, ⊓)>1} is the set of all cut hyperedges. There are two prominent objective functions in the hypergraph partitioning context: the cut metric and the connectivity metric. The cut metric is the generalization of the edge-cut objective in graph partitioning, and can be represented as:

$$\mathrm{cut}(\Pi)=\Sigma_{e\in E'} \omega(e) \quad (4)$$

The connectivity metric (also called (λ−1) metric) considers how many blocks a hyperedge is spanning. For example:

$$(\lambda-1)(\Pi)=\Sigma_{e\in E}(\lambda(e,\Pi)-1)\omega(e) \quad (5)$$

In an example hypergraph that is partitioned into k=3 blocks where all blocks have an equal size of c($V_i$)=2, an example cut metric can be provided as cut(⊓)=1, and an example connectivity metric can be provided as (λ−1)(n)=2.

In contrast to vertex partitioning, which is implemented in some distributed database systems, hyperedge partitioning partitions hypergraphs by cutting vertices instead of edges. A hypergraph partitioning algorithm has been proposed for hyperedge partitioning based on hyperedge moves, where a hypergraph H=(V, E, c, ω) is partitioned into k disjoint sets of hyperedges ⊓={$E_1$, . . . , $E_k$}, while keeping the weight of the block balanced. Analogously, λ(v, ⊓)=|{$E_i$∈⊓|v∈$E_i$}| can be defined as the number of blocks a vertex v is part of and V(⊓)={v∈V|λ(v, ⊓)>1} can be defined as the set of cut vertices. Using these definitions, the cut metric and connectivity metric can be respectively defined as:

$$\mathrm{cut}(\Pi)=\Sigma_{v\in V(\Pi)} c(v) \quad (6)$$

$$(\lambda-1)(\Pi)=\Sigma_{v\in V}(\lambda(v,\Pi)-1)c(v) \quad (7)$$

Hypergraph partitioning is NP-complete in that it is both NP and NP-hard. In view of this, several heuristics have been created to solve the partitioning problem. The most common heuristic to solve the partitioning problem is the multilevel paradigm, which includes multiple phases. In a first phase, referred to as the coarsening phase, the input hypergraph is recursively coarsened to create a hierarchy of smaller hypergraphs by calculating clusterings or vertex matchings, which are then contracted. Each coarsened hypergraph represents one level. As soon as a predefined number of vertices is reached, a second phase, referred to as the initial partitioning phase, takes place in which algorithms are applied to the smallest hypergraph to partition it into k blocks. In a third phase, referred to as the refinement phase, the coarsening is undone by uncontracting the vertices in reverse order of contraction and simultaneously using a local search heuristic to improve the quality of the solution.

Implementations of the present disclosure also leverage the maximum weighted bipartite matching problem.

Definition 3 (Bipartite Graph): A bipartite graph G=(V=L∪R, E) with L∩R=∅ is a graph where ∀e={u, v}∈E: u∈L∧v∈R. Based on this definition of bipartite graphs the maximum bipartite matching problem as:

Definition 4 (Maximum Bipartite Matching Problem): Given a bipartite graph G=(V=L∪R, E), the maximum bipartite matching problem is to select a subset M ⊆ E such that for each node v∈V there is at most one edge e∈M with v∈e while maximizing |M|. If, for each node v∈V, there exists exactly one edge e∈M with v∈e, then M is called a perfect matching.

The maximum bipartite matching problem can be solved by converting the graph into a flow network and calculating the maximum flow. An extension of the maximum bipartite matching problem is the maximum weighted bipartite matching problem.

Definition 5 (Maximum Weighted Bipartite Matching Problem): Given a weighted bipartite graph G=(V=L∪R, E, ω) with an edge weight function ω: E→ℝ, the maximum weighted bipartite matching problem is to select a bipartite matching M ⊆ E such that the sum of edge weights in M is maximized.

The maximum weighted bipartite matching problem also appears in the context of hypergraph partitioning with fixed vertices, which means that vertices are preassigned to specific blocks, to which the vertices are assigned to after the partitioning.

One method used to solve the maximum weighted bipartite matching problem is the so-called Hungarian algorithm, which makes use of the duality between the maximum weighted bipartite matching problem and finding the minimum weighted vertex cover in bipartite graphs.

Definition 6 (Minimum Weighted Vertex Cover Problem): Given a weighted bipartite graph G=(V=L∪R, E, ω) with an edge weight function ω: E→ℝ, the minimum weighted vertex cover problem is to choose labels U=($u_1$, . . . , $u_{|L|}$) and V=($v_1$, . . . , $v_{|R|}$) such that ∀i, j: $u_i$+$v_j$≥$\omega_{i,j}$, while minimizing the sum of all labels.

The Hungarian algorithm creates such a vertex cover U, V for a bipartite graph G, and constructs a subgraph that contains an edge between each node u∈L and v∈R, where the condition $u_i$+$v_i$=$\omega_{i,j}$ holds for its corresponding labels. If a perfect matching is found in the subgraph, the matching can be returned as a solution for the problem. Otherwise, the cover is adjusted until a perfect matching is found. The Hungarian algorithm solves the maximum weighted bipartite matching problem in $\mathcal{O}(n^3)$ time.

To provide further context for implementations of the present disclosure, a distributed database can be described as a collection of multiple, logically interrelated databases (also called hosts) distributed over a computer network. The data of a distributed database is partitioned using a partition function and is spread across the hosts of the database. Distributed databases promise higher scalability, reliability, and availability than non-distributed databases, but require more complex mechanisms to guarantee data integrity. Further, distributed databases imply a communication overhead in query processing, because hosts have to communicate with each other to process queries that touch data from multiple hosts.

As described in further detail herein, distributed databases are partitioned into shards to make them scalable. The primary way in which distributed databases are scaled is by horizontal partitioning of the data. Horizontal partitioning splits the rows of a table into disjoint subsets, called shards, which are distributed over the hosts of the database system. Two prominent partition functions for database partitioning are hash partitioning and the range partitioning.

For example, $T=(t_1, \ldots, t_n)$ is a table, where $t_i$ represents tuple i of T, and $p(t_i)$ is a function that extracts partition relevant information from row $t_i$. An example for such a function is the extraction of the value of the primary key from tuple $t_i$. A hash partition function can be provided using a universal hash function $h(p(t_i))$ that assigns all tuples $t_i$ to a shard with index $\{1, \ldots, k\}$, where k is usually the number of hosts. Instead of using a hash partition function, a range partition function could be used. Based on a sequence $S=(s_1, \ldots, s_{k-1}|s_j<s_{j+1})$, the shards are created by assigning each row $t_i$ to shard l, where l is either the highest index for which $p(t_i) \leq s_j$ is fulfilled or k if $p(t_i) > s_{k-1}$. A benefit of using a hash function is that it leads to shards of equal size and avoids clustering of the data. On the other hand, range partitioning increases the performance for range scans on the partitioned column, hence it is often used to partition tables on a timestamp column, leading to small scans if data from a month or year is queried.

Implementations of the present disclosure are described in further detail herein with reference to an example distributed database system. The example distributed database system includes SAP Vora provided by SAP SE of Walldorf, Germany. It is contemplated, however, that implementations of the present disclosure can be realized in any appropriate distributed database system.

FIG. 1 provides a schematic representation of SAP Vora as a distributed database system 100. SAP Vora can be described as a distributed database system for big data processing and is designed to scale with workload by scaling up the number of computing nodes in a cluster 102. For example, the cluster 102 can be provided as a Kubernetes cluster, which includes a master node and a set of computing nodes (also referred to as worker nodes). SAP Vora is designed for both OLTP workloads and OLAP workloads.

In relevant part, the example distributed database system 100 includes one or more tools 104, a transaction coordinator 106, cluster services 108, engines 110, and a persistence module 112. In some examples, the tools 104 include a query editor (e.g., a SWL editor), data browser, and a view modeling environment. In some examples, the transaction coordinator 106 manages execution of queries on the engines 108. In the depicted example, the cluster services include a catalog server 120, a landscape manager 122, a transaction broker 124, a discovery service 126, and a cluster manager 128. In some examples, the catalog server 120 provides a distributed metadata store that stores changes to metadata in a server (e.g., a DLog Server). The catalog server 120 maintains metadata about the database objects stored in the engines 110. In some examples, the landscape manager 122 controls data partitioning and placement across database engines, as described in further detail herein. In some examples, the transaction broker 124 provides a read-write lock mechanism for DDL statements. This ensures that both the catalog and instances of the query engine keep a consistent state at all times. In some examples, the discovery service 126 manages the service endpoints in the cluster 102 and runs health checks on all registered services at pre-defined intervals. In some examples, the cluster manager 128 is used to run all services on a cluster of compute nodes, and enables deployment, maintenance, and monitoring of the services. In some examples, the engines 110 provide specialized storage and processing capabilities for relational, graph, time series, and document data. The engines 110 communicate with each other during data partitioning and query processing.

Further detail on the example distributed database system 100 is provided in the Developer Guide for SAP Vora in SAP Data Hub, Document Version: 2.4.1-2019-01-25, published by SAP SE of Walldorf, Germany, the contents of which are expressly incorporated herein by reference in the entirety for all purposes.

As described herein, within a distributed database system, tables are horizontally split into shards using a hash partition function or a range partition function to make the database scalable and to distribute the workload. In some examples, the shards are assigned to the computing nodes in round-robin fashion. The transaction coordinator 106 is the entry point of the distributed database system 100, which can be used to execute queries by connecting to the tools 104 or other interfaces (e.g., Java database connectivity (JDBC)). The transaction coordinator 106 also controls the execution of queries by generating an execution plan that is sent to the engines 108. For plan generation, metadata describing the database structure and the data layout is retrieved from the catalog server 120 and host assignment information is retrieved from the landscape manager 122. After sending the execution plan to the engines 108, the engines 108 generate execution code for the plan, execute the code to get the result, whereby the engines 108 communicate with each other if it is required. The result is propagated back to the user. SAP Vora supports different types of engines (e.g., in-memory engines, disk-based engines). The landscape manager 122 is responsible for data placement and the distributed log (in the persistence module 112) is responsible for persistence of metadata and information needed to recover system after failover.

As introduced above, OLTP workloads are characterized by many short running queries that often affect only single or a small number of tuples in the database. The workload typically includes SELECT, INSERT, DELETE, and/or UPDATE statements that are used to control and run daily tasks. Because the queries are typically short running, database systems designed for OLTP workloads try to optimize the throughput of the database system. On the other hand, OLAP workloads include long running queries with a low volume of transactions that often affect a large number of tuples in the database. The workload typically includes read-only queries that operate on consolidated data from one or several OLTP databases. OLAP workloads are used to analyze data and help with decision making and planning. For OLAP systems, the response time of queries is a metric often used to measure performance.

In general, the resource allocation problem is to find an optimal allocation of a fixed amount of activities to resources, such that the costs incurred are minimized. As described herein, implementations of the present disclosure solve the allocation problem in the context of distributed databases and OLTP workloads. In this context, the allocation problem can be defined as:

Definition 7 (Allocation Problem): Given a distributed database consisting of a set of hosts H={1, . . . , k}, a set of shards S={$s_1$, . . . , $s_n$}, an expected query workload Q=($q_1$, . . . , $q_m$), the allocation problem is to assign shards to the hosts such that a certain objective function for the given workload is maximized or minimized.

Example objective functions include, without limitation, the throughput of the system, and the response time of the queries.

As described herein, distributed database tables are partitioned into shards and spread across the hosts of the database. Queries that touch shards from multiple hosts are expensive in OLTP settings because they lead to a communication overhead and a duplication of the load. Furthermore, the workload should be balanced across the hosts to avoid overloaded or idling hosts.

To optimize the shard assignment in the distributed database system, implementations of the present disclosure provide the workload-aware reassignment framework, which reduces the number of distributed queries while keeping the load on the hosts balanced. As described herein, the workload is modeled and a hypergraph partitioner is used to assign shards to hosts.

Implementations of the present disclosure are workload-aware by monitoring the executed queries Q=($q_1$, . . . , $q_m$), where each query q∈Q touches a given set of shards. In some examples, the executed queries are monitored in real-time (e.g., on-the-fly as they are executed) to avoid having to replay queries, as required in some traditional approaches. Formally, for all queries q∈Q, it can be defined that q⊆S. A workload hypergraph is provided as H=(S, E=Q, c, ω). In some implementations, the query sequence Q is assigned to a hyperedge set E, which consists of all distinct queries of the workload (in general |E|≤|Q|). The functions c and ω are chosen according to a preconfigured weight policy. An example weight policy is the frequency weight policy:

$$\forall s \in S: c(s) = |\{q \in Q | s \in q\}| \quad (8)$$

$$\forall e \in E: \omega(e) = |\{q \in Q | e = q\}| \quad (9)$$

where c(s) denotes the number of queries that shard s is part of and ω(e) denotes the number of queries that touch the same shards as hyperedge e.

By partitioning the workload hypergraph H using the frequency weight policy, frequently co-accessed shards are placed together. In this manner, the number of distributed queries is minimized, and the workload is balanced, such that all hosts have to process a nearly equal number of queries.

Another example policy includes the execution time policy, for which a function $t_{exec}(q)$ that returns the execution time for a query and a function $t_{exec}(q, s)$ that returns the execution time of a query q on the host where shard s is placed on are provided. Using these functions, c(s) and ω(e) are respectively provided as:

$$\forall s \in S: c(s) = \sum_{\substack{q \in Q \\ s \in q}} t_{exec}(q, s) \quad (10)$$

$$\forall e \in E: \omega(e) = \sum_{\substack{q \in Q \\ e = q}} t_{exec}(q) \quad (11)$$

where c(s) denotes the total execution time of all queries where s is part of and ω(e) denotes the total execution time of queries that touch the same shards as hyperedge e.

By partitioning the workload hypergraph H using the execution time weight policy, shards that are frequently co-accessed by long running queries (e.g., multi table joins) are placed together and the workload is balanced so that all hosts have a nearly equal execution time.

In some implementations, the workload is modeled at the shard level instead of tuple level. This is because some distributed database systems, such as SAP Vora, are only able to track access at the shard level. However, shards are an aggregation of tuples and using such aggregations instead of working at the tuple level provides greater scalability and less sensitivity to workload changes To trigger reassignment, the workload-aware reassignment framework uses a dedicated query command (SQL command), which can be designated as reass (see Listing 1 below). The hypergraph model is provided based on the monitored queries Q and is partitioned. The results are used to move (reassign) the shards. To be able to partition the hypergraph model, the hypergraph model is integrated as a library into the distributed database system.

Listing 1: Example Reassignment Query Syntax (reass)

```
01| REASSIGN PARTITIONS WITH 'HYPERGRAPH' OPTIONS (
02|   EPSILON 0.1, WEIGHT POLICY 'FREQUENCY',
03|   TRANSFORMATION 'SCHISM', OBJECTIVE 'KM1',
      SAMPLING_FACTOR 0.5
04| );
```

All parameters of the reassignment statement are configurable and are defined in Table 1, below.

TABLE 1

Description of Reassignment Query Parameters

| | |
|---|---|
| WITH | The method that is used to optimize the assignment (e.g., KaDaRea, described herein). |
| EPSILON | The imbalance parameter ε passed to the hypergraph partitioner. |
| WEIGHT_POLICY | The weight policy that determines the weights in the hypergraph. Possible values are frequency or execution_time. |
| TRANSFORMATION | The transformation that is used to enrich or modify the workload model. |
| OBJECTIVE | The objective that is minimized by the hypergraph partitioner (e.g., km1, cut) |
| SAMPLING_FACTOR | Indicating the fraction of queries that are sampled before building the workload model. It can be any numeric value in (0, 1). |

Figure 2:
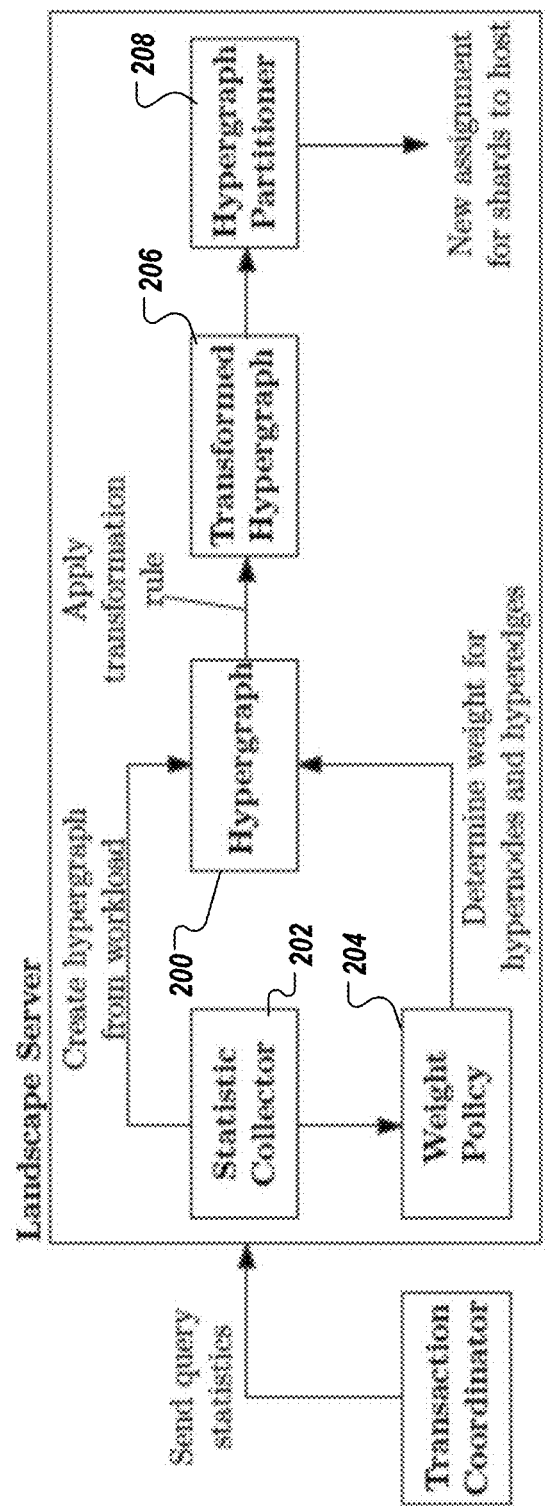
FIG. 2 schematically depicts reassignment within the example distributed database system in accordance with implementations of the present disclosure.

FIG. 2 schematically depicts reassignment within the example distributed database system in accordance with implementations of the present disclosure. More particularly, one or more actions in accordance with implementations of the present disclosure can be executed in the landscape server (e.g., the landscape manager 122 of FIG. 1), which is responsible for data placement. In some implementations, the landscape server aggregates statistics about each executed query, which are extracted and forwarded from the transaction coordinator (e.g., the transaction coordinator 106 of FIG. 1) to the landscape server. These statistics contain information about touched shards of a query and the execution times on each host, which are used to build the hypergraph model of the workload.

FIG. 2 shows the design of workload-aware reassignment and the steps that occur, if a reassignment is triggered. The first step is that the landscape server builds an internal representation 200 of the hypergraph model of the workload. For each query $q \in Q$ that is stored in a component, referred to as a statistic collector 202, the spanned shards are added as vertices to the hypergraph and a hyperedge connecting these shards is added.

If the sampling factor is set, the queries are sampled before creating the workload hypergraph. In this manner, the effects of having smaller monitoring timespans can be simulated, because, in some systems, monitoring each query could be very expensive in terms of technical resources expended. Moreover, the landscape component scans for shards that are not touched by any query and adds them to hypergraph to receive the complete unweighted workload hypergraph. The workload hypergraph is transformed into a weighted hypergraph by applying a weight policy 204 specified in the reassignment query. The weighted hypergraph model is transformed based on a transformation rule to provide a transformed hypergraph 206. Both the weight policy and the transformation rule are extendable to experiment with other weight policies or to extend the basic model with more advanced techniques. The transformed hypergraph 206 is transformed into the input data structure of the interface of a hypergraph parititioner 208, which is called to partition the hypergraph into k (number of hosts) blocks with the configured imbalance parameter (specified by option EPSILON) and objective function (specified by option OBJECTIVE). The hypergraph partitioner is integrated into Vora and the communication between Vora and the hypergraph partitioner takes place by using a library interface. The result of the hypergraph partitioning is k disjoint blocks that describe which shards should be placed together.

Before moving the shards to the respective hosts, a mapping between the current assignment $\Psi = \{\Psi_1, \ldots, \Psi_k\}$ and the new assignment $\Pi = \{\Pi_1, \ldots, \Psi_k\}$ is determined, such that the required moves are minimized. To achieve this, and with reference to FIG. 3, a weighted bipartite graph 300 (i.e., $G = (V = L \cup R, E, \omega)$) is created, in which the nodes on the left side L represent the blocks of the new assignment, and the nodes on the right side R represent the blocks of the current assignment. An edge between a node $u \in L$ and $v \in R$ is weighted with the number of vertices that the corresponding blocks $\Pi_u$ and 105 $_v$ have in common. More formally, $\omega(u, v) = |\Pi_u \cap \Psi_v|$. In order to minimize the number of moves, a permutation of the new assignment $\Pi$ is found, such that $\Sigma_{i \in \{1, \ldots, k\}} |\Psi_i \cap \Pi|$ is maximized. This is an instance of the maximum weighted bipartite matching problem, described above, and can be solved by applying the Hungarian algorithm, described above, on the bipartite graph G.

Figure 3:
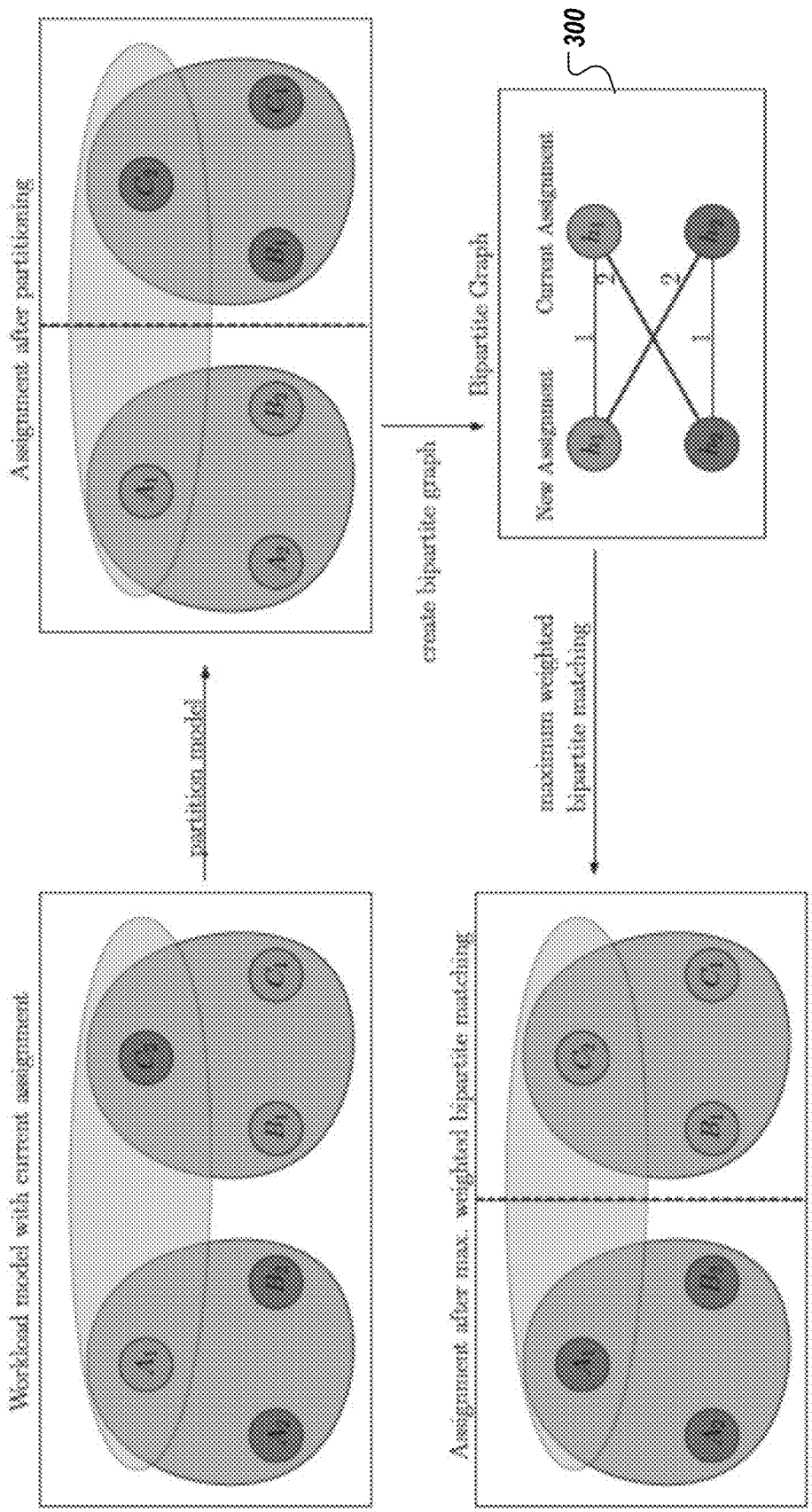
FIG. 3 depicts an example of use of maximum weighted bipartite matching for reassignment of shards.

FIG. 3 schematically depicts an example of use of maximum weighted bipartite matching for reassignment of shards. More particularly, FIG. 3 depicts a reduced number of moves by using maximum weighted bipartite matching, where different shading indicates respective hosts, to which shards can be assigned. Initially, shards $A_1$, $B_1$, and $C_1$ are placed on host $h_1$. Partitioning the workload hypergraph reduces the distributed queries by placing $A_1$, $A_2$, and $B_2$ together, however the partitioning result would place them on $h_1$, resulting in a total of 4 moves. By finding the maximum weighted bipartite matching between the new assignment and the current assignment, $A_1$, $A_2$, and $B_2$ are placed on $h_2$, reducing the required moves to 2.

After the moves that are to be executed for reassignment are determined, the landscape server sends move instructions to the transaction coordinator. Further, the landscape server updates the shard information in the catalog server to indicate the hosts that the respective shards are now moved to. In this manner, subsequent incoming queries are routed to the appropriate hosts in the case of reassigned shards.

Implementations of the present disclosure further provide a window-based shard reassignment protocol for solving the allocation problem in context of shard placement. The shard reassignment protocol of the present disclosure is referred to herein as KaDaRea (short for Karlsruhe Database Reassigning). In some implementations, and as described in further detail herein, KaDaRea divides the workload into time intervals and partitions the workload hypergraph for each time interval. In some implementations, a rating function is used to optimize shard placement in presence of workload peaks or even changes in the workload patterns. In this manner, shard assignments (reassignments) are achieved that are optimized for peaks in the workload and that are balanced.

To provide further context for the shard reassignment protocol of the present disclosure, in real-world applications, the workload processed by a distributed database system varies heavily depending on the time of the day and/or external events. On the one hand, the intensity of the workload changes. As such, there are times when the workload is low and there are peak times when the workload is much higher. Most distributed database systems can handle the low or regular load without any advanced repartitioning techniques. However, distributed database systems can fail to deliver expected service performance during peak times. Examples of peak times can include, without limitation, popular sport events leading to failures at sport streaming services and launches of new products on online ecommerce stores.

Further, the mixture of workload changes over time results in patterns in the workload. An example of this includes multi-tenant distributed database systems, in which teams from different regions are working on the same database. By way of non-limiting example, one team can be located in Central Europe and another team in the US. The different teams access different tables of the database to fulfill their tasks. Because the US workday is much later than the workday in Central Europe, there are different patterns of workloads, one for the team in Central Europe and one for the team in the US. Partitioning the workload model of these two workload patterns without considering when the workload is executed could result in an assignment that is bad for both patterns. This is because the assignment is imbalanced at any point in time even if the partitioning result of the combined workload is balanced.

In view of this, the window-based shard reassignment protocol of the present disclosure (KaDaRea) splits the workload into several time slices and partitions each workload hypergraph independently. This can be referred to as a sliding window. The resulting assignments for the different time intervals are aggregated in a rating function and weighted with the relative workload inside a time slice. A shard is assigned to a block with the highest rating. An advantage of the shard reassignment protocol of the present disclosure is that it gives windows with peak workload more impact to be able to adapt better to peak times. Further, by partitioning the hypergraph using a sliding window, the weight of nodes from different time slices do not interact when trying to find a balanced partitioning as they do when we partition the hypergraph without sliding windows.

Figure 4:
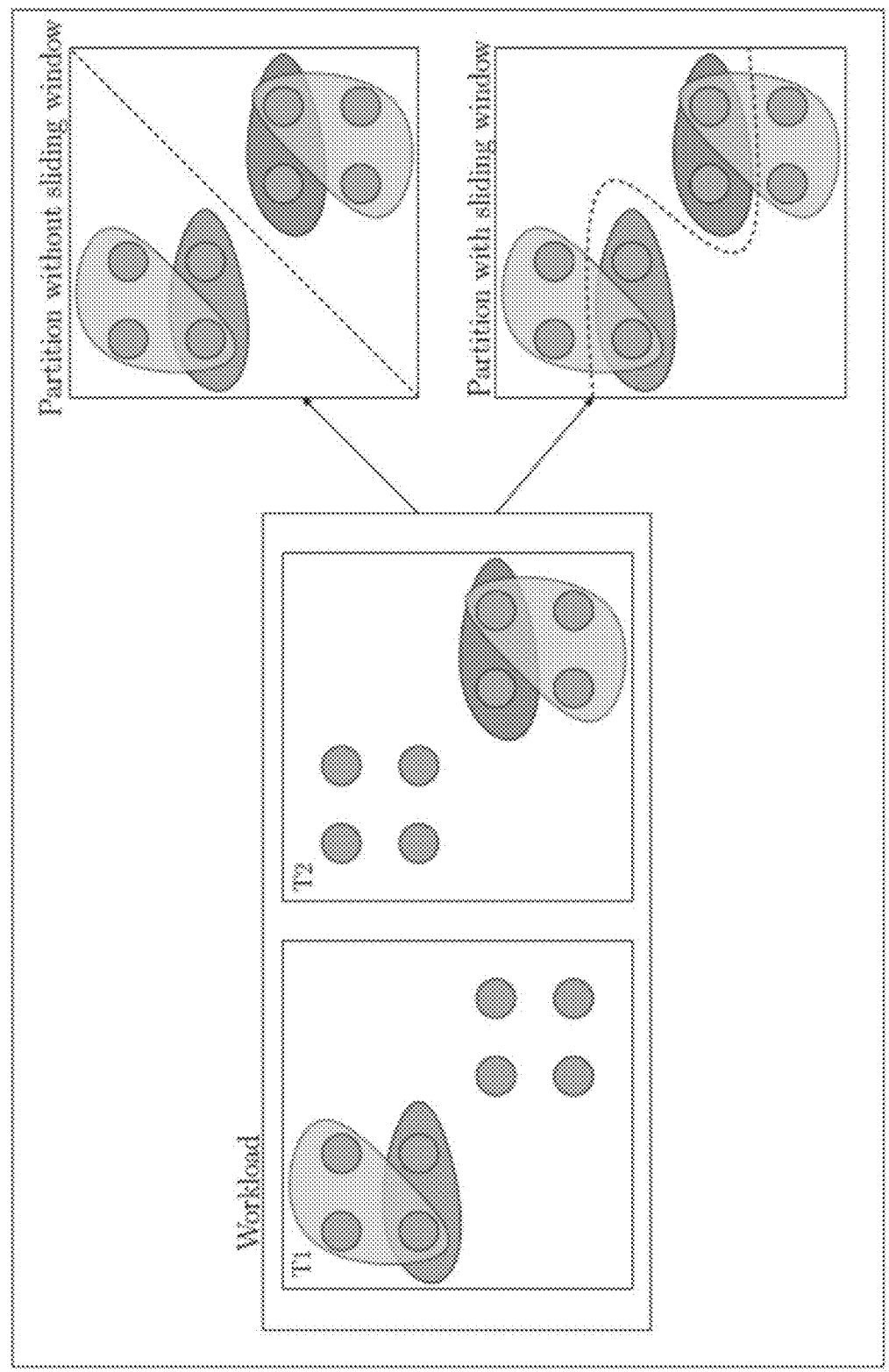
FIG. 4 depicts an example use of a sliding window to provide a balanced assignment for changing workload patterns.

FIG. 4 depicts an example use of a sliding window to provide a balanced assignment for changing workload patterns. In a time interval T1, only the upper shards are queried and, in a time interval T2, only the lower shards are queried. If the resulting workload hypergraph is partitioned without considering when the queries are executed, the best assignment is to assign the upper shards to one host and the lower ones to the other host, as depicted on the top right of FIG. 5. However, this assignment is heavily imbalanced, because, in either timeframe one host is busy while the other host is idling. A better assignment regarding performance and load balance is to divide the upper and lower group of shards and assign one part of each group to a host, resulting in a utilization of both hosts at any time, as depicted on the lower right of FIG. 4.

In accordance with implementations of the present disclosure, for a query $q \in Q$, functions $t_s(q)$ and $t_e(q)$ with $t_s(q) < t_e(q)$ are defined, which return the start and end time of a query. Using these functions, the sequence of all queries $Q_w$ is constructed and a workload hypergraph $H_w$ for time interval $w=[t_s, t_e)$ is provided as follows:

$$Q_w = (q_i \in Q | t_s \leq t_s(q_i) \wedge t_e(q_i) < t_e) \quad (12)$$

$$H_w = (S, E=Q_w, c_w, \omega_w) \quad (13)$$

The weight functions $c_w$ and $\omega_w$ are one of the weight policies described above based on the queries in $Q_w$. To trigger reassignment, the workload-aware reassignment framework uses a dedicated query command (SQL command), which can be designated as reass_sw (see Listing 2 below). To be able to partition the hypergraph model using KaDaRea, the hypergraph model is integrated as a library into the distributed database system.

Listing 2: Example Reassignment Query Syntax (reass_sw)

```
01|    REASSIGN PARTITIONS WITH 'KaDaRea' OPTIONS (
02|        EPSILON 0.1, WEIGHT_POLICY 'FREQUENCY',
03|        SLIDING_WINDOW_SIZE 50, SLIDING_WINDOW_STEP 10
04|    );
```

In some examples, $w_{size} > 0$ is the sliding windows size and $w_{step} > 0$ is the sliding window step with $w_{step} \leq w_{size}$. The window size defines how large each window is (e.g., a size of 10s would mean that all queries that are executed in the time frame [t, t+10s] are considered for this time interval). The window step describes how fast the window moves (e.g., a step of 3s and a size of 10s means that the windows are [0, 10], [3, 13], [6, 16], etc.). In some examples, the window size and the window step are predefined (e.g., set by a user/administrator). A set of windows $W=\{w_0, \ldots, w_l\}$ can be defined, where:

$$w_i = [t_{start} + i \cdot w_{step}, t_{start} + 1 \cdot w_{step} + w_{size}] \quad (14)$$

where $t_{start} = \min(t_s(Q))$. A parameter 1 is defined as the minimum index where for $w_l = [t_s, t_e)$ the condition $t_e > \max(t_e(Q))$ holds.

In accordance with implementations of the present disclosure, the partitioning of the hypergraph H can be determined using a sliding window algorithm described in Listing 3, below. For each window w, the hypergraph $H_w$ is created and is partitioned into k disjoint blocks $\Pi = \{\Pi_1, \ldots, \Pi_k\}$, where k is the number of hosts in the cluster. For all shards s, a rating is stored to each block $\Pi_i$. The rating reflects how often the respective shard s was placed on $\Pi_i$ multiplied with a window factor. The factor of a window gives windows with a higher load more impact, leading to an assignment that is optimized for workload peaks. This is represented as follows:

$$f(w_i) = \left(\frac{c_{w_i}(S)}{M}\right)^2 \quad (15)$$

In some implementations, before increasing the rating of the blocks, the most similar permutation between the last partitioning result $\Pi_{last}$ and the current result $\Pi$ is determined. This is because a partitioning result can be equal to the last partition, but only differ in the indices of the blocks. This is the same instance of the maximum weighted bipartite matching problem that is described above and solved by applying the Hungarian algorithm. Each shard is assigned to the block with the highest rating.

Listing 3: Window-based Shard Reassignment Protocol (KaDaRea)

```
     input: Q, w_size, w_step, k
     output: Π
1    t = min(t_s(Q))
2    W = ( )
3    do  //determine all windows
4        W.append([t, t + w_size])
5        t = t + w_step
6    while t ≤ max(t_e(Q))
7    ∀s ∈ S: ∀i ∈ {1, ..., k}: R(s, i)  //set initial rating of shards to blocks
8    Π_last = 0    //partitioning results of previous window
9    M = max_{w∈W}(c_w(S))
10   foreach w ∈ W do
11       H_w = (S, E = Q_w, c_w, ω_w)
```

-continued

Listing 3: Window-based Shard Reassignment Protocol (KaDaRea)

```
12       Π = partition(H_w, k)
         //find most similar permutation to Π_last by max.weighted
                 bipartite matching
13       Π = maximumWeightedBipartiteMatching(Π, Π_last)
14       foreach s in S do
15           R(s, i) += c_w(s)/M  where s ∈ Π_i
16       Π_last = Π
17       foreach s ∈ S do
18           Assign s to Π_i where i = arg max_{i∈[1,k]}(R(s, i))
```

As described herein, the window-based shard reassignment protocol of the present disclosure provides several advantages. One advantage is that queries during a peak load have more impact on the partitioning result. Another advantage is that, if the workload patterns change over time, partitioning the hypergraph using a sliding window will result in a more balanced partitioning, which results in a better utilization of the distributed database system. Further, queries are monitored in real-time (i.e., on-the-fly) as they are executed in the distributed database system. In this manner, replaying queries, as required in some traditional approaches, is avoided.

Figure 5:
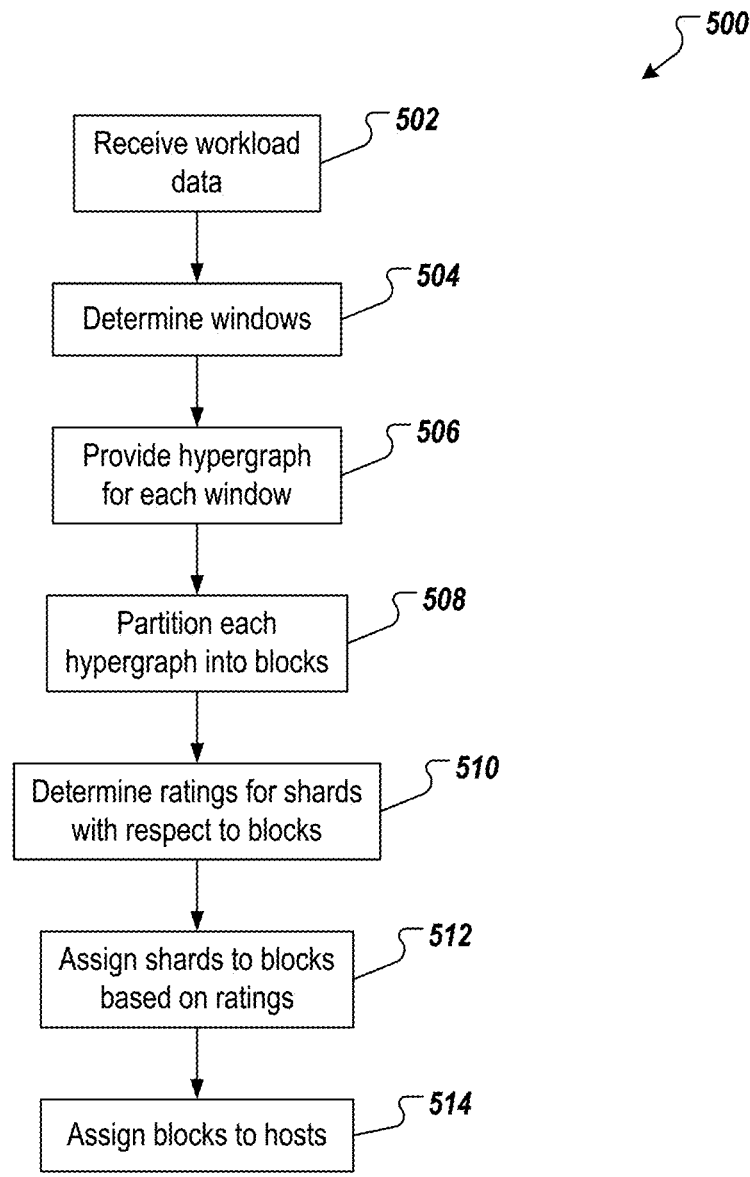
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Workload data is received (502). For example, the workload-aware reassignment framework receives a set of queries Q executed over a predefined period of time within a distributed database system. As described herein, each query in the set of queries is associated with a respective start time and a respective end time. A set of windows is defined (504). For example, a window size ($w_{size}$) and a window step ($w_{step}$) are provided as input to the workload-aware reassignment framework. In some examples, the windows are provided as time slices between an earliest start time and a latest end time of the queries in the set of queries based on the window size and the window step.

A hypergraph is provided for each window (506). For example, and as described herein, a hypergraph for a respective window is provided as $H_w=(S, E=Q_w, c_w, \omega_w)$, where $Q_w$ is a sub-set of queries of the set of queries (i.e., the sub-set of queries includes queries within the respective window), and weight functions $c_w$ and $\omega_w$ are one of the weight policies described above based on the queries in $Q_w$. Each hypergraph is partitioned into blocks (508). For example, a partition parameter k is provided as input to the workload-aware reassignment framework, and each hypergraph is partitioned into k blocks $\Pi=\{\Pi_1, \ldots, \Pi_k\}$.

Ratings are determined for shards with respect to blocks (510). For example, and as described herein, within a set of blocks of a respective hypergraph, a rating value is generated for each shard and block pair. In this manner, each shard is associated with a set of ratings, each rating being specific to a block in the set of blocks. In some examples, each rating is calculated based on a maximum shard weight for shards in the set of shards, and a shard weight of the respective shard, for which the rating is calculated. Each shard is assigned to a block based on ratings (512). For example, for each shard, a maximum rating value is determined and the shard is assigned to the block associated with the maximum rating value. Each block is assigned to a host (514).

Implementations of the present disclosure achieve advantages over traditional shard reassignment approaches. For example, as evaluated within a commercial enterprise system (e.g., SAP Vora) and using TPC-C and TPC-E benchmarks, and implementations of the present disclosure provide a significant performance improvement for both throughput and response time. For example, throughput increased 1.78 times on 4 hosts and 1:94 times on 8 hosts for the TPC-C benchmark. For the more complex TPC-E benchmark, throughput increased 3.09 times on 4 hosts and 5:11 times on 8 hosts. Further, implementations of the present disclosure are able to achieve accurate workload models using sampling. In this manner, monitoring all queries is avoided, which can be expensive in terms of time and technical resources.

Another insight is that, to make the distributed database system scalable, the shard assignment has to be optimized, otherwise there is little to no effect in adding hosts to the cluster. As described herein, the window-based shard reassignment protocol (KaDaRea) of the present disclosure considers the time of execution of queries by splitting the workload into time slices and partitioning based on the time slices. This enables optimization of the shard assignments for peaks in the workload and provides better assignments in the presence of changes in workload patterns. Evaluations show that KaDaRea outperforms other shard assignment techniques in workloads having peaks and/or pattern changes. In these cases, implementations of the present disclosure result in approximately 46% more throughput during peak times and approximately 92% more throughput with workload pattern changes, as compared to approaches that do not use a sliding window.

Figure 6:
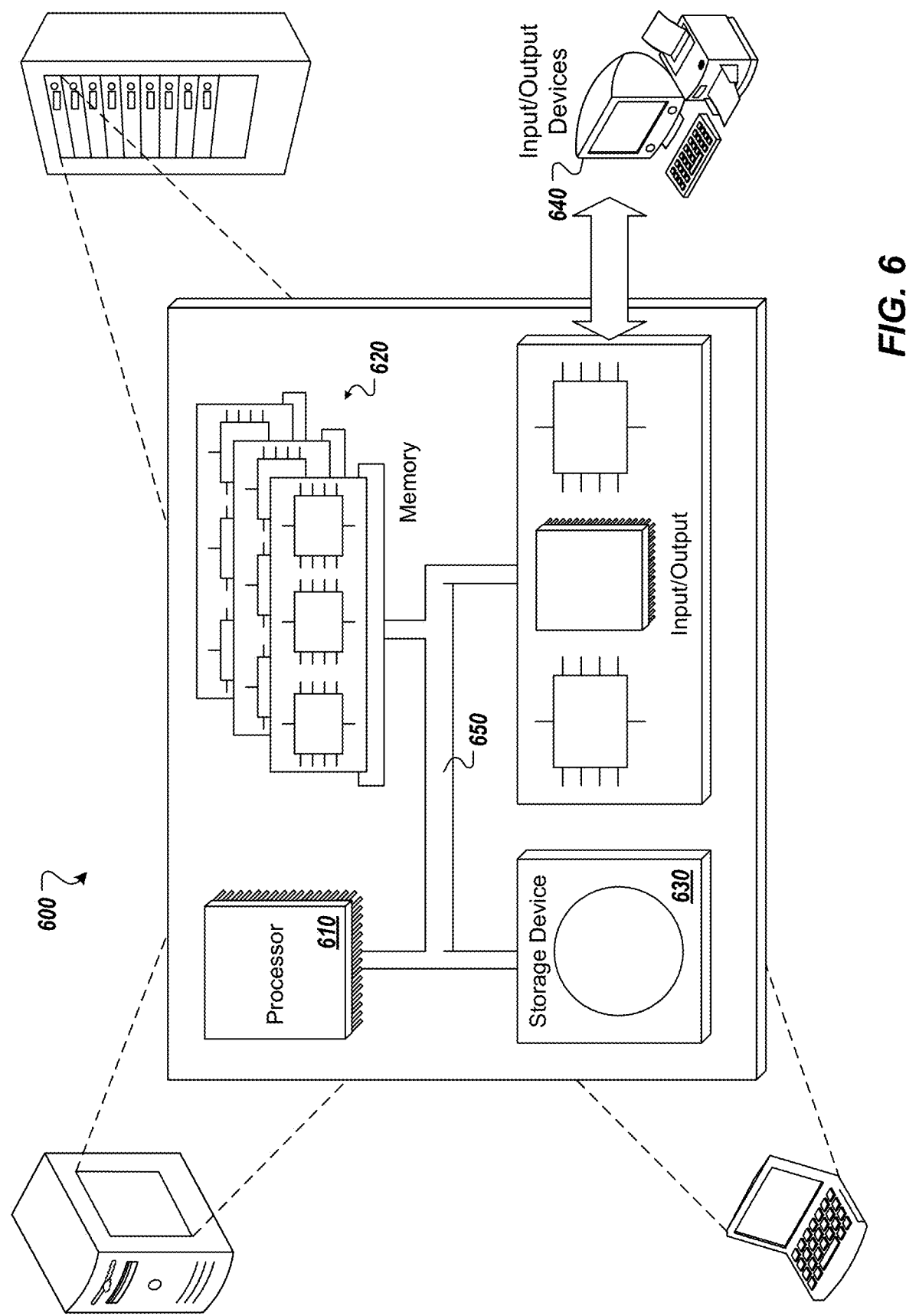
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for assigning shards to hosts in a distributed database system, the method being executed by one or more processors and comprising:
   receiving workload data, the workload data comprising a set of queries executed within a distributed database system over a period of time;
   defining a set of windows, each window comprising a time slice within the period of time;
   generating a hypergraph for each window in the set of windows, each hypergraph comprising a set of vertices and a set of hyperedges and being generated based on a sub-set of queries of the set of queries and a set of weight functions, weight functions in the set of weight functions respectively representing a number of queries that a respective shard is part of and a number of queries that query data stored in shards included in a hyperedge of a respective hypergraph;
   partitioning each hypergraph into a set of blocks;
   for each shard in a set of shards, determining a set of ratings, each rating in the set of ratings being based on a weight of a respective shard with respect to a respective block; and
   assigning each shard in the set of shards to a block in the set of blocks based on the set of ratings for the respective shard, the shard being assigned to a block, for which a maximum rating is provided in the set of ratings.

2. The method of claim 1, wherein the set of windows is defined based on a window size, a window step, an earliest start time of the queries in the set of queries, and a latest end time of the queries in the set of queries.

3. The method of claim 1, wherein a partition parameter is provided as input and each hypergraph is partitioned into blocks based on the partition parameter.

4. The method of claim 1, wherein each rating is calculated based on a maximum shard weight for shards in the set of shards, and a shard weight of the respective shard, for which the rating is calculated.

5. The method of claim 1, further comprising assigning shards to hosts based on blocks that the shards are respectively assigned to.

6. The method of claim 1, wherein the workload data is monitored in real-time as queries are executed within the distributed database system.

7. A non-transitory computer-readable storage medium coupled to one or more processors and having instructions stored thereon which, when executed by the one or more processors, cause the one or more processors to perform operations for assigning shards to hosts in a distributed database system, the operations comprising:
   receiving workload data, the workload data comprising a set of queries executed within a distributed database system over a period of time;
   defining a set of windows, each window comprising a time slice within the period of time;
   generating a hypergraph for each window in the set of windows, each hypergraph comprising a set of vertices and a set of hyperedges and being generated based on a sub-set of queries of the set of queries and a set of weight functions, weight functions in the set of weight functions respectively representing a number of queries that a respective shard is part of and a number of queries that query data stored in shards included in a hyperedge of a respective hypergraph;
   partitioning each hypergraph into a set of blocks;
   for each shard in a set of shards, determining a set of ratings, each rating in the set of ratings being based on a weight of a respective shard with respect to a respective block; and
   assigning each shard in the set of shards to a block in the set of blocks based on the set of ratings for the respective shard, the shard being assigned to a block, for which a maximum rating is provided in the set of ratings.

8. The computer-readable storage medium of claim 7, wherein the set of windows is defined based on a window size, a window step, an earliest start time of the queries in the set of queries, and a latest end time of the queries in the set of queries.

9. The computer-readable storage medium of claim 7, wherein a partition parameter is provided as input and each hypergraph is partitioned into blocks based on the partition parameter.

10. The computer-readable storage medium of claim 7, wherein each rating is calculated based on a maximum shard weight for shards in the set of shards, and a shard weight of the respective shard, for which the rating is calculated.

11. The computer-readable storage medium of claim 7, wherein operations further comprise assigning shards to hosts based on blocks that the shards are respectively assigned to.

12. The computer-readable storage medium of claim 7, wherein the workload data is monitored in real-time as queries are executed within the distributed database system.

13. A system, comprising:
a computing device; and
a computer-readable storage device coupled to the computing device and having instructions stored thereon which, when executed by the computing device, cause the computing device to perform operations for natural language explanations for assigning shards to hosts in a distributed database system, the operations comprising:
receiving workload data, the workload data comprising a set of queries executed within a distributed database system over a period of time;
defining a set of windows, each window comprising a time slice within the period of time;
generating a hypergraph for each window in the set of windows, each hypergraph comprising a set of vertices and a set of hyperedges and being generated based on a sub-set of queries of the set of queries and a set of weight functions, weight functions in the set of weight functions respectively representing a number of queries that a respective shard is part of and a number of queries that query data stored in shards included in a hyperedge of a respective hypergraph;
partitioning each hypergraph into a set of blocks;
for each shard in a set of shards, determining a set of ratings, each rating in the set of ratings being based on a weight of a respective shard with respect to a respective block; and
assigning each shard in the set of shards to a block in the set of blocks based on the set of ratings for the respective shard, the shard being assigned to a block, for which a maximum rating is provided in the set of ratings.

14. The system of claim 13, wherein the set of windows is defined based on a window size, a window step, an earliest start time of the queries in the set of queries, and a latest end time of the queries in the set of queries.

15. The system of claim 13, wherein a partition parameter is provided as input and each hypergraph is partitioned into blocks based on the partition parameter.

16. The system of claim 13, wherein each rating is calculated based on a maximum shard weight for shards in the set of shards, and a shard weight of the respective shard, for which the rating is calculated.

17. The system of claim 13, wherein operations further comprise assigning shards to hosts based on blocks that the shards are respectively assigned to.

18. The method of claim 1, wherein each shard in the set of shards is provided by horizontal partitioning of at least one database table, shards in the set of shards being distributed over hosts in the distributed database system.

19. The computer-readable storage medium of claim 7, wherein each shard in the set of shards is provided by horizontal partitioning of at least one database table, shards in the set of shards being distributed over hosts in the distributed database system.

20. The system of claim 13, wherein each shard in the set of shards is provided by horizontal partitioning of at least one database table, shards in the set of shards being distributed over hosts in the distributed database system.

* * * * *